(12) United States Patent
Kobayashi

(10) Patent No.: US 12,219,188 B2
(45) Date of Patent: Feb. 4, 2025

(54) CHEERING SUPPORT METHOD, CHEERING SUPPORT APPARATUS, AND PROGRAM

(71) Applicant: NIPPON TELEGRAPH AND TELEPHONE CORPORATION, Tokyo (JP)

(72) Inventor: Kazunori Kobayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 77 days.

(21) Appl. No.: 18/016,851

(22) PCT Filed: Jul. 21, 2020

(86) PCT No.: PCT/JP2020/028303
§ 371 (c)(1),
(2) Date: Jan. 18, 2023

(87) PCT Pub. No.: WO2022/018828
PCT Pub. Date: Jan. 27, 2022

(65) Prior Publication Data
US 2023/0353800 A1   Nov. 2, 2023

(51) Int. Cl.
*H04N 21/239*   (2011.01)
*H04N 21/233*   (2011.01)

(52) U.S. Cl.
CPC ....... *H04N 21/239* (2013.01); *H04N 21/2335* (2013.01)

(58) Field of Classification Search
CPC .......................... H04N 21/239; H04N 21/2335
See application file for complete search history.

(56) References Cited

U.S. PATENT DOCUMENTS

2009/0019467 A1* 1/2009 Kim ................... H04N 21/4756
  725/14
2023/0188770 A1* 6/2023 Ikeda ................. H04N 21/4667
  725/10

FOREIGN PATENT DOCUMENTS

WO   2019229909 A1   12/2019

OTHER PUBLICATIONS

Dwango Co., Ltd. "Let's watch—What is a live broadcast made with you, NicoNico Live Broadcast?" niconico live [online] Accessed on Jun. 18, 2020, website: https://site.live.nicovideo.jp.
(Continued)

*Primary Examiner* — Mulugeta Mengesha

(57) ABSTRACT

The user communicates reactions to the distribution source without inputting character strings, and parties of an event naturally feel the reactions of the users so as not to disturb the progress. A cheering support device (2) reproduces, in a space of a distribution source, a cheering composed of an acoustic signal based on sounds generated by viewers in a plurality of spaces different from the space of the distribution source and a video signal. A voice acquisition unit (22) acquires a voice material from a voice material storage unit (24). A video acquisition unit (25) acquires a video material from a video material storage unit (27) according to the voice material acquired by the voice acquisition unit (22). A voice reproduction unit (23) emphasizes and reproduces the voice material corresponding to the sound type in which many viewers have uttered. A video reproduction unit (26) reproduces the video material acquired by the video acquisition unit (25).

20 Claims, 10 Drawing Sheets

(56) References Cited

OTHER PUBLICATIONS

Kamamoto et al. (2018) "The evaluation of APRICOT system for high-realistic live viewing" Proceedings of the 2018 Spring Meeting of the Acoustical Society of Japan, Mar. 2018, pp. 1555-1556.

* cited by examiner ns are given to constituent elements that have the same functions and repeated description thereof will be omitted.

CHEERING SUPPORT METHOD, CHEERING SUPPORT APPARATUS, AND PROGRAM

CROSS-REFERENCE TO RELATED APPLICATIONS

This application is a U.S. National Stage Application filed under 35 U.S.C. § 371 claiming priority to International Patent Application No. PCT/JP2020/028303, filed on 21 Jul. 2020, the disclosure of which is hereby incorporated herein by reference in its entirety.

TECHNICAL FIELD

Background Art

In recent years, a use form for distributing events such as sport to a plurality of bases via a network such as the Internet has been widely used (for example, NPL 1). FIG. 1 is a diagram showing an outline of a distribution disclosed in NPL 1. The distribution system includes a video distribution device 9 for generating a distribution video on the basis of an original video obtained by photographing an event to be distributed, and distributing the distribution video on the Internet. The user 10-$n$ (n=1 to N, N is integer and equal to or more than 1) views the video distributed from the video distribution device 9 by using each user terminal 8-$n$. The user 10-$n$ inputs character strings representing an impression, a comment, or the like from an input unit 81 of the user terminal 8-$n$, while viewing the distribution video in real time. A transmission unit 82 of the user terminal 8-$n$ transmits the input character string to the video distribution device 9. A character string reception unit 91 of the video distribution device 9 receives character strings from each user terminal 8-$n$. A character string addition unit 92 of the video distribution device 9 adds the received character strings to the original video to generate the distribution video. The generated distribution video is distributed to each user terminal 8-$n$. In this way, the distribution system of NPL 1 can transmit the reaction of each user to the distributor of the event and other users.

CITATION LIST

Non Patent Literature

[NPL 1] DWANGO Co., Ltd. "Let's view Nico Nico Live" [online], [Searched on Jun. 26, 2020], Internet <URL: https://site.live.nicovideo.jp/>

SUMMARY OF INVENTION

Technical Problem

However, in the distribution system disclosed in NPL 1, the users have to input an impression, a comment, and the like in character strings, which is complicated. For example, in the event of sport, it is difficult for the players to play while visually recognizing the character strings transmitted from the users.

In view of the above technical problem, it is an object of the present invention to realize a technique in which users can transmit reactions to a distribution source without inputting character strings and parties of an event can naturally feel the reactions of the users without disturbing the progress of that.

Solution to Problem

In order to solve the above problem, a cheering support method according to an embodiment of the present invention is a cheering support method for reproducing, in a space of a distribution source, cheering composed of an acoustic signal based on sounds uttered by viewers in a plurality of spaces different from the space of the distribution source and/or a video signal and includes a step of acquiring the cheering, a reproduce step of reproducing the acquired cheering, and the acquired cheering corresponding to the sound type with many audiences among the plurality of sound types is more emphasized and reproduced, and the cheering corresponding to the sound type with few audiences is less emphasized and reproduced.

Advantageous Effects of Invention

According to the present invention, since cheering composed of a voice corresponding to a type of sound uttered by the users and/or a video is emphasized and reproduced based on the number of users who have uttered the type of sound in the distribution source, the users can transmit reactions to the distribution source without inputting character strings, and the parties of the event can naturally feel the user's reactions so as not to disturb the progress.

DESCRIPTION OF EMBODIMENTS

Figure 1:
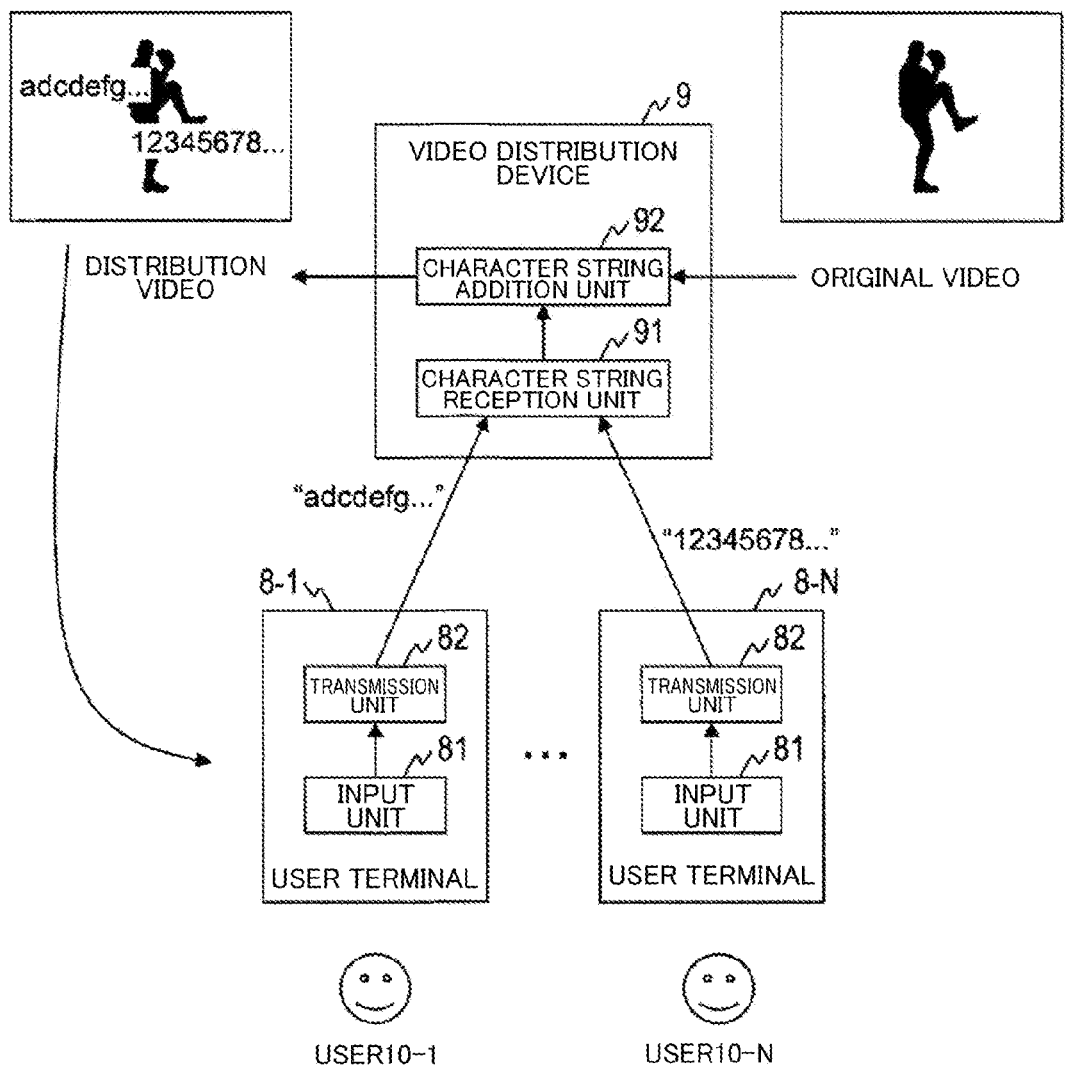
FIG. 1 a diagram illustrating a conventional art.

An embodiment of this invention will be described in detail hereinafter. In the drawings, the same reference numerals are given to constituent elements that have the same functions and repeated description thereof will be omitted.

Embodiment

Figure 2:
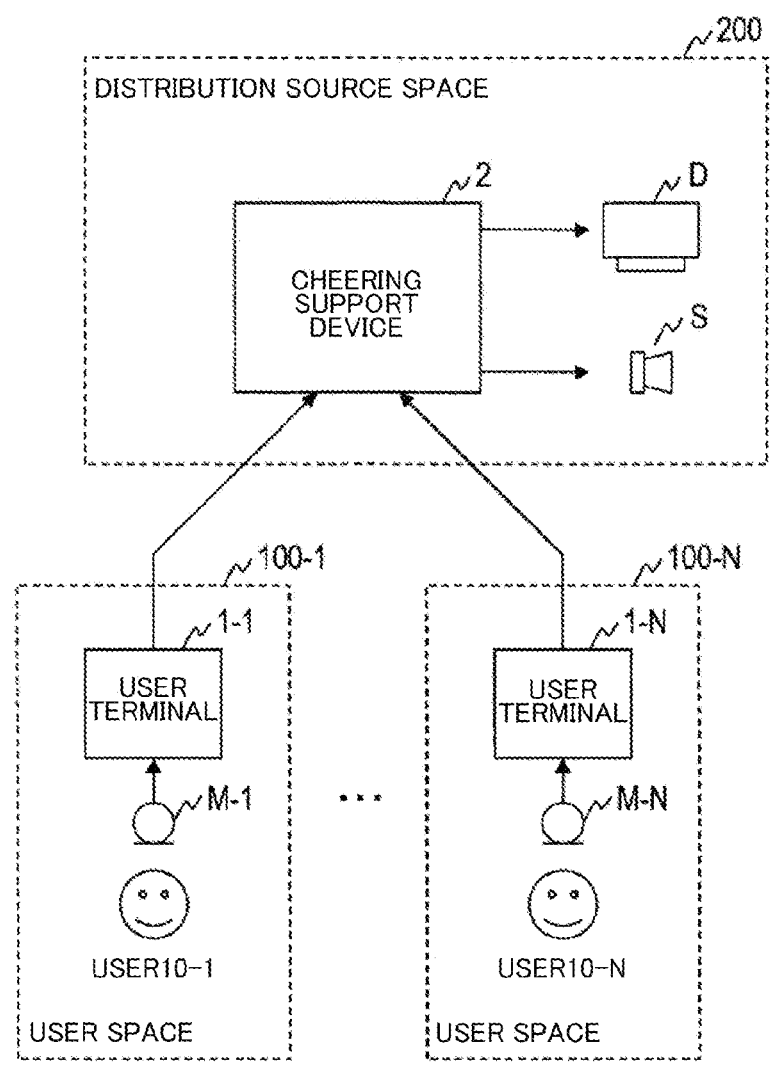
FIG. 2 is a diagram exemplifying a functional configuration of a cheering support system.

An embodiment of the present invention is a cheering support system
that generates the cheering composed of an acoustic signal on the basis of a sound generated by a user viewing an event or the like distributed to a plurality of bases, and reproduces the cheering at a base of a distribution source. As shown in FIG. 2, the cheering support system of the embodiment includes N pieces of user spaces 100-1 to 100-N and one piece of distribution source space 200. For example, in the case of an event of a sport, the distribution source space is a space where the sport is performed (for example, a stadium), and the user space is a space where the user views the event (for example, a home). Each space may be distributed in a plurality of buildings that are geographically spaced apart, or may be a plurality of rooms in one building.

In each user space 100-n, user 10-n and user terminal 1-n exist. The user 10-n views the distributed video by using the user terminal 1-n. A microphone M-n for collecting the sound generated by the user 10-n is connected to the user terminal 1-n. The microphone M-n may be connected from the outside of the user terminal 1-n by various interfaces such as wired or wireless, or may be built in the housing of the user terminal 1-n.

In the distribution source space 200, at least a cheering support device 2 exists. A speaker S for reproducing the cheering (hereinafter, called "cheering voice"), which is an acoustic signal, and a display D for reproducing the cheering (hereinafter, called "cheering video"), which is a video signal, are connected to the cheering support device 2. The speaker S and the display D may be connected from the outside of the cheering support device 2 by various kinds of wired or wireless interfaces, may be built in a housing of the cheering support device 2, or may be formed integrally with the housing of the cheering support device 2.

Figure 3:
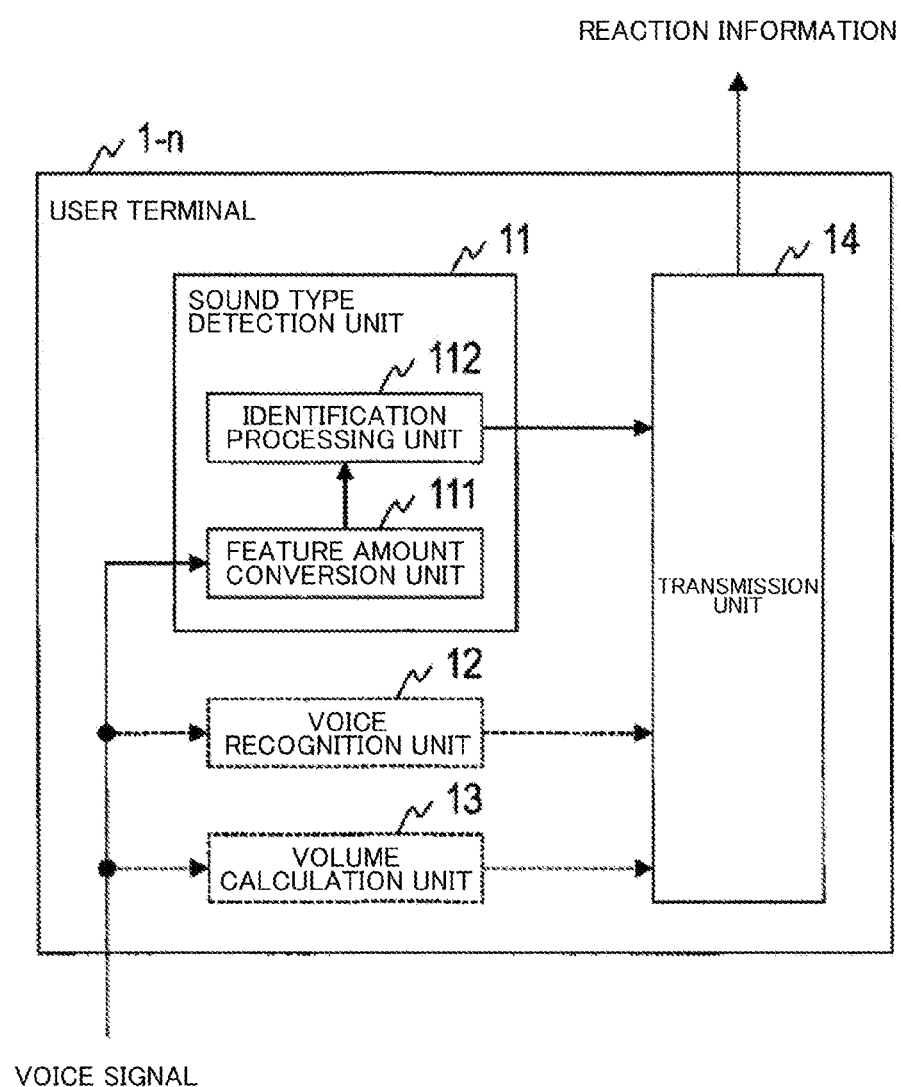
FIG. 3 is a diagram exemplifying a functional configuration of a user terminal.

As shown in FIG. 3, the user terminal 1-n includes a sound type detection unit 11 and a transmission unit 14. The sound type detection unit 11 includes a feature amount conversion unit 111 and an identification processing unit 112. The user terminal 1-n may further include a voice recognition unit 12 and a volume calculation unit 13. The user terminal 1-n may include only any one of a sound type detection unit 11, a voice recognition unit 12, and a volume calculation unit 13, any two combinations, or all three.

Figure 4:
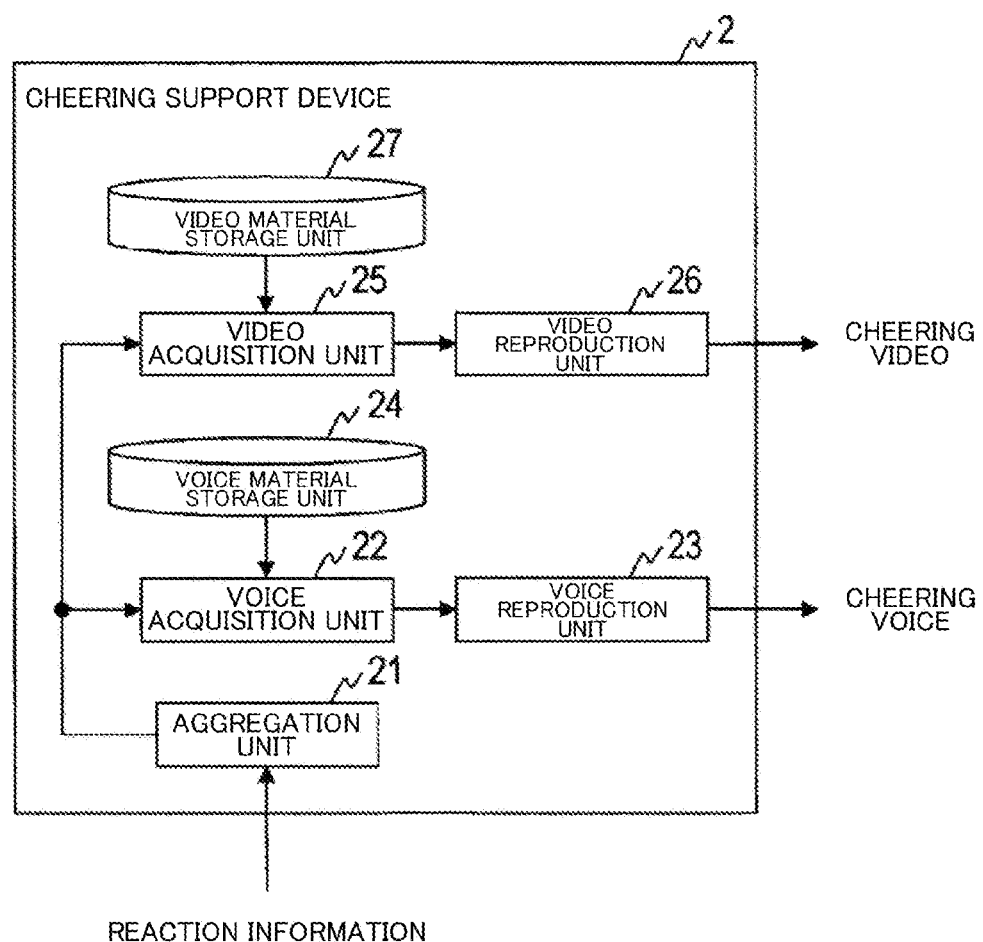
FIG. 4 is a diagram exemplifying a functional configuration of a cheering support device.

As shown in FIG. 4, the cheering support device 2 includes an aggregation unit 21, a voice acquisition unit 22, a voice reproduction unit 23, a voice material storage unit 24, a video acquisition unit 25, a video reproduction unit 26, and a video material storage unit 27. When the cheering to be reproduced is composed of only an acoustic signal, the video acquisition unit 25, the video reproduction unit 26, and the video material storage unit 27 need not be provided. When the cheering to be reproduced consists of only the video signal, the voice acquisition unit 22, the voice reproduction unit 23, and the voice material storage unit 24 need not be provided.

The user terminal 1-n and the cheering support device 2 are the specific device configured to, for example, read a specific program into a known or dedicated computer having a central processing unit (CPU), main memory (RAM: Random Access Memory), or the like. The user terminal 1-n and the cheering support device 2 executes each process under the control of the central processing unit, for example. Data input to the user terminal 1-n and the cheering support device 2 data obtained by the various processing is stored in the main storage device, for example, and data stored in the main storage device is read out to the central processing unit and utilized in other processing as required. The user terminal 1-n and the cheering support device 2 may be at least configured by hardware such as an integrated circuit. The storage units included in the cheering support device 2 can be constituted by, for example, a main storage device such as a RAM (Random Access Memory), an auxiliary storage device constituted by a semiconductor memory element such as a hard disk, an optical disc, or a flash memory, or middleware such as a relational database or a key value store.

Specifically, the user terminal 1-n is a mobile terminal such as a smart phone or an information processing device having a voice signal processing function and a data communication function such as a personal computer of a desktop type or a laptop type. Specifically, the cheering support device 2 is an information processing device having a data communication function and a data processing function such as a server computer of the desktop type or the rack mount type.

Figure 5:
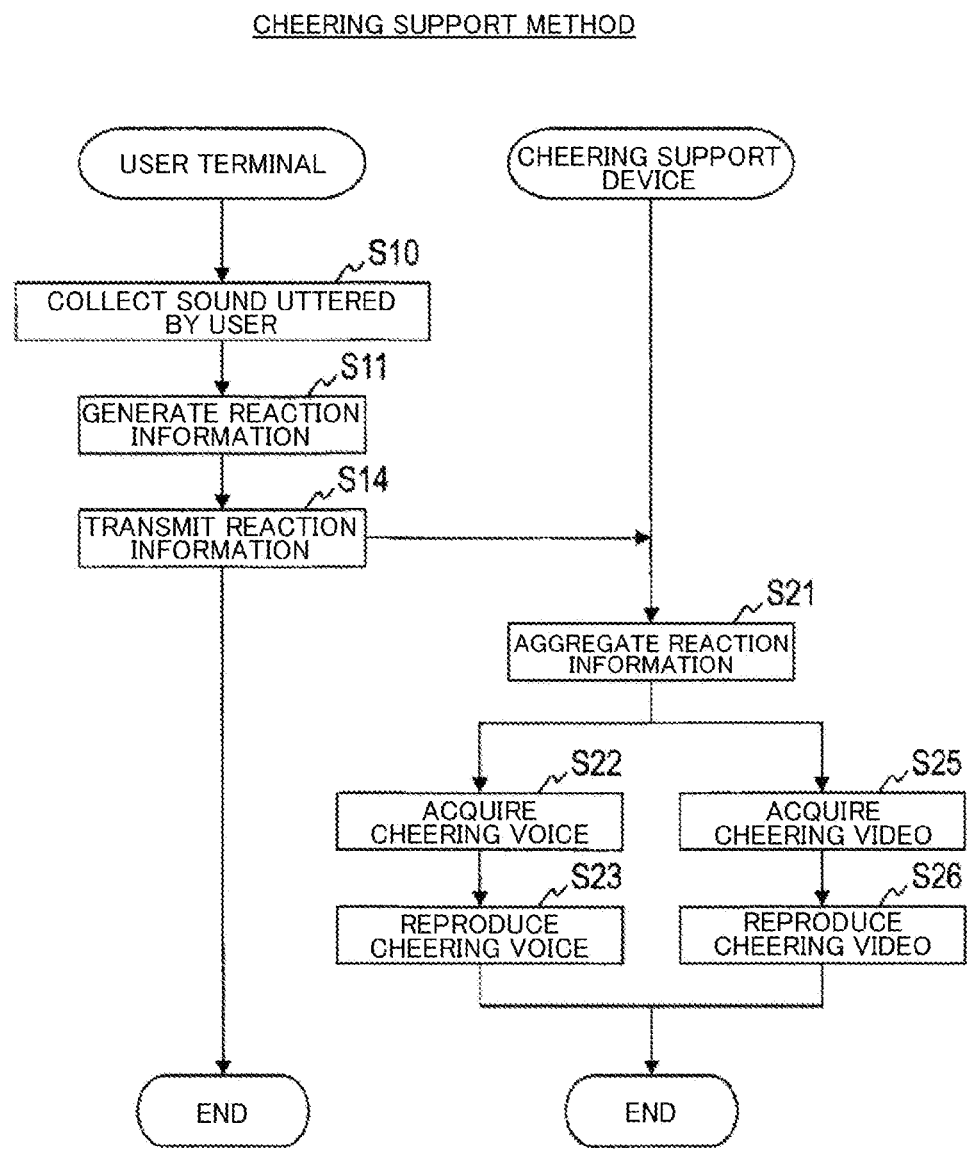
FIG. 5 is a diagram exemplifying a processing procedure of a cheering support method.

The user terminal 1-n and the cheering support device 2 cooperate to execute the steps shown in FIG. 5, thereby the cheering support method of the embodiment is realized. A cheering support method executed by the cheering support system of the embodiment will be described below.

In a step S10, a microphone M-n connected to a user terminal 1-n collects a sound (below, "reaction of a user") generated by a user 10-n. For example, when the video to be distributed is a sport game, the response of the user includes sounds of the clap, glad shouts, sounds of a cheering, or the like. Therefore, the acoustic signal collected by the microphone M-n may be a voice signal including the user's voice, or may be a voice signal not including the user's voice. The acoustic signal collected by the microphone M-n is input to the sound type detection unit 11 of the user terminal 1-n. When the user terminal 1-n includes the voice recognition unit 12 and/or a volume calculation unit 13, the acoustic signal collected by the microphone M-n is input to the voice recognition unit 12 and/or the volume calculation unit 13.

In a step S11, the user terminal 1-n generates reaction information representing a reaction of the user on the basis of the acoustic signal collected by the microphone M-n. The content of the reaction information differs depending on which of the sound type detection unit 11, the voice recognition unit 12, and the volume calculation unit 13 is provided in the user terminal 1-n.

When the user terminal 1-n includes a sound type detection unit 11, the reaction information includes a result of identifying which of a plurality of predetermined sound types the sound uttered by the user is. That is, the sound type detection unit 11 identifies the input acoustic signal to any of a plurality of predetermined sound types, and outputs the identification result as reaction information. For example, when the video to be distributed is a sport game, the predetermined sound type is, for example, claps, glad shouts, cheering, or the like. Specifically, first, the feature amount conversion unit 111 converts the input acoustic signal into an acoustic feature amount such as a frequency spectrum or a cepstrum, for example. Then, an identification processing unit 112 inputs the acoustic feature amount to a discriminator such as a neural network learned in advance, and thereby identifies which of predetermined sound types the acoustic feature quantity corresponds.

When the user terminal 1-n includes a voice recognition unit 12, the reaction information includes a character string represented by a voice uttered by the user. That is, the voice recognition unit 12 converts the input acoustic signal into a character string by performing voice recognition, and outputs the character string as reaction information.

When the user terminal 1-n includes a volume calculation unit 13, the reaction information includes a volume of a sound uttered by the user. That is, the volume calculation unit 13 calculates the volume of the input acoustic signal and outputs information representing the volume as reaction information.

In a step S14, the transmission unit 14 of the user terminal 1-$n$ transmits reaction information output by at least one of the sound type detection unit 11, the voice recognition unit 12, and the volume calculation unit 13 to the cheering support device 2. The cheering support device 2 inputs the reaction information received from each user terminal 1-$n$ to the aggregation unit 21.

Figure 6:
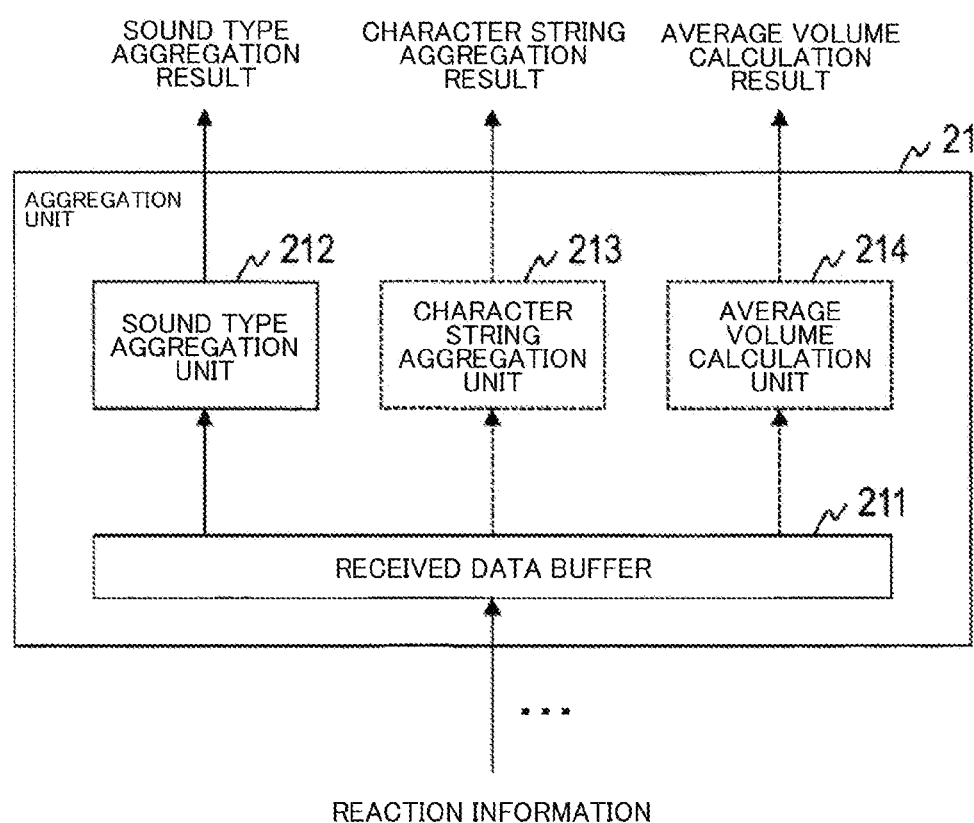
FIG. 6 is a diagram exemplifying a functional configuration of an aggregation unit.

In a step S21, the aggregation unit 21 of the cheering support device 2 aggregates the reaction information received from each user terminal 1-$n$, and outputs the aggregated result. As shown in FIG. 6, for example, the aggregation unit 21 includes a received data buffer 211 and a sound type aggregation unit 212. The aggregation unit 21 may further include a character string aggregation unit 213 and/or an average volume calculation unit 214. Whether or not the aggregation unit 21 includes the character string aggregation unit 213 and an average volume calculation unit 214 is determined by the content of the reaction information received from the user terminal 1-$n$. That is, when the reaction information includes the character string (that is, when the user terminal 1-$n$ includes the voice recognition unit 12), the aggregation unit 21 includes the character string aggregation unit 213. In addition, when the reaction information includes the volume (that is, when the user terminal 1-$n$ includes the volume calculation unit 13), the aggregation unit 21 includes an average volume calculation unit 214.

The received data buffer 211 stores the reaction information received from each user terminal 1-$n$ in the FIFO buffer for a predetermined time. The length of time for accumulation is set in advance, and is, for example, about 1 second to several tens of seconds. The sound type aggregation unit 212 counts the reaction information stored in the received data buffer 211 (that is, the identification result of the sound type) for each sound type, and outputs a sound type aggregation result indicating the number of receptions for each sound type (that is, the number of viewers who have uttered sounds corresponding to the sound type). The character string aggregation unit 213 counts reaction information stored in the received data buffer 211 (that is, a voice recognition result) for each character string, and outputs a character string aggregation result indicating the number of receptions for each character string (that is, the number of viewers who have uttered the character string). The average volume calculation unit 214 outputs an average volume calculation result indicating an average of volumes within a predetermined time from the reaction information (that is, the volume) stored in the received data buffer 211. The volume aggregation result may be an average value of the entire viewer or an average value of each sound type or each character string.

In a step S22, the voice acquisition unit 22 of the cheering support device 2 acquires and outputs cheering voice to be reproduced in the distribution source space on the basis of the aggregation result output by the aggregation unit 21. The voice acquisition unit 22 acquires the cheering voice by using a voice material prepared in advance and stored in the voice material storage unit 24.

Figure 7:
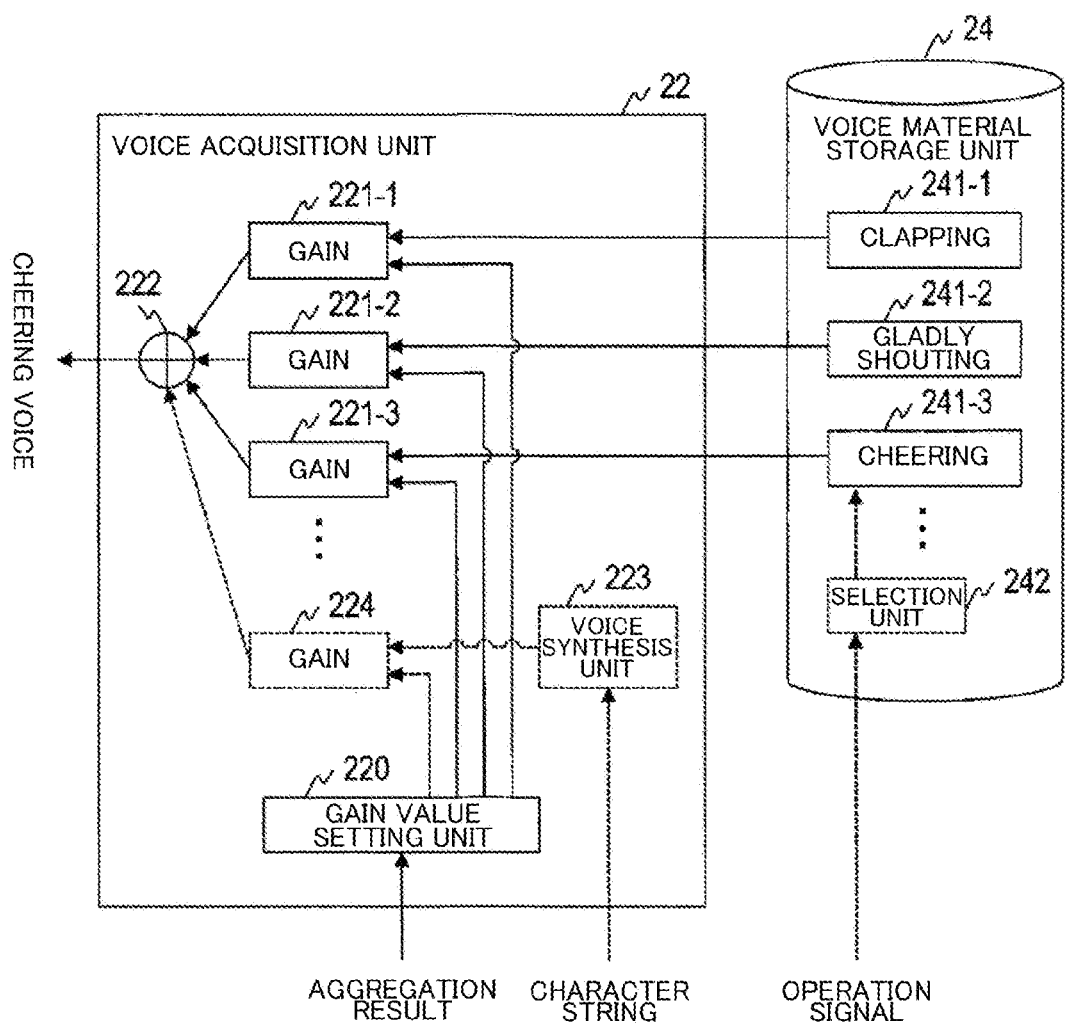
FIG. 7 is a diagram exemplifying a functional configuration of a voice acquisition unit and a voice material storage unit.

As shown in FIG. 7, the voice material storage unit 24 stores K kinds of voice materials 241-1 to 241-$k$ (K is the number of the sound types, and an integer of 2 or more) in advance. Each sound material 241-$k$ ($k=1$ to K) is a preset acoustic signal corresponding to each of a plurality of sound type identifying the sounds uttered by the users. For example, when the video to be distributed is a sport game, it is sufficient to prepare the sound material 241-1 of a sound in which many spectators are clapping, the sound material 241-2 of a sound in which many spectators are gladly shouting, the sound material 241-3 of a sound in which many spectators are cheering, and the like. The cheering sound may be changed according to the progress state of the game (for example, in the case of a baseball game, when a cheering song is different for each batter, or when a runner is in a score zone and in the good chance to get a score). In this case, the voice material storage unit 24 further includes a selection unit 242. The selection unit 242 changes the voice material 241-3 of the cheering sound to a designated acoustic signal according to an operation signal input from the outside automatically or manually by following a predetermined rule.

As shown in FIG. 7, the voice acquisition unit 22 includes a gain value setting unit 220, K pieces of gains 221-$k$, and an addition unit 222. Each gain 221-$k$ corresponds to the voice material 241-$k$, respectively. The gain value setting unit 220 calculates and sets the gain 221-$k$ corresponding to each voice material 241-$k$ on the basis of the aggregation result output by the aggregation unit 21. For example, the gain is set according to the number of receptions of each sound type represented by the sound type aggregation result. In this case, when the number of reception for each sound type is denoted as Nk, the gain Gk is obtained by $Gk=\alpha \cdot Nk$. Here, $\alpha$ is a predetermined positive integer, and is the reversed number of the views, for example. Alternatively, only the sound type having the largest number of receptions may be validated, and the gain of the other sound types may be set to 0. In addition, for example, the gain may be set in accordance with a value obtained by multiplying the number of received sound types by the average volume (that is, the sum of the volumes of the viewers for each sound type) by using the average volume for each sound type indicated by the average volume calculation result. In this case, the average volume for each sound type is defined as Vk, and the gain Gk is obtained by $Gk=\alpha \cdot Vk \cdot Nk$. The addition unit 222 adds each signal obtained by multiplying the voice material 241-$k$ by the gain 221-$k$, and outputs it as a cheering voice.

The voice acquisition unit 22 may further include a voice synthesis unit 223 and a gain 224. The voice synthesis unit 223 and the gain 224 are required when the user terminal 10-$n$ includes the voice recognition unit 12 (that is, when the reaction information input to the aggregation unit 21 includes a character string of a voice recognition result and the aggregation unit 21 outputs a character string aggregation result). The voice synthesis unit 223 extracts a predetermined number of character strings from the character string aggregation result in descending order of the number of receptions, and performs voice synthesis of the character strings. The gain value setting unit 220 calculates and sets the gain 224 according to the number of receptions of each character string and its average volume. The addition unit 222 adds a signal obtained by multiplying an output signal of the voice synthesis unit 223 by the gain 224 in addition to each signal obtained by multiplying the voice material 241-$k$ by the gain 221-$k$, and outputs it as the cheering voice. At this time, the maximum value of each gain may be set so that the signal after addition does not exceed the upper limit of the gain.

In a step S23, the voice reproduction unit 23 of the cheering support device 2 reproduces the cheering voice output by the voice acquisition unit 22 from the speaker S connected to the cheering support device 2.

In a step S25, the video acquisition unit 25 of the cheering support device 2 acquires and outputs a cheering video to be reproduced in a distribution source space on the basis of the aggregation result output by the aggregation unit 21. The video acquisition unit 25 acquires the cheering video by using the video material prepared in advance and stored in the video material storage unit 27.

Figure 8:
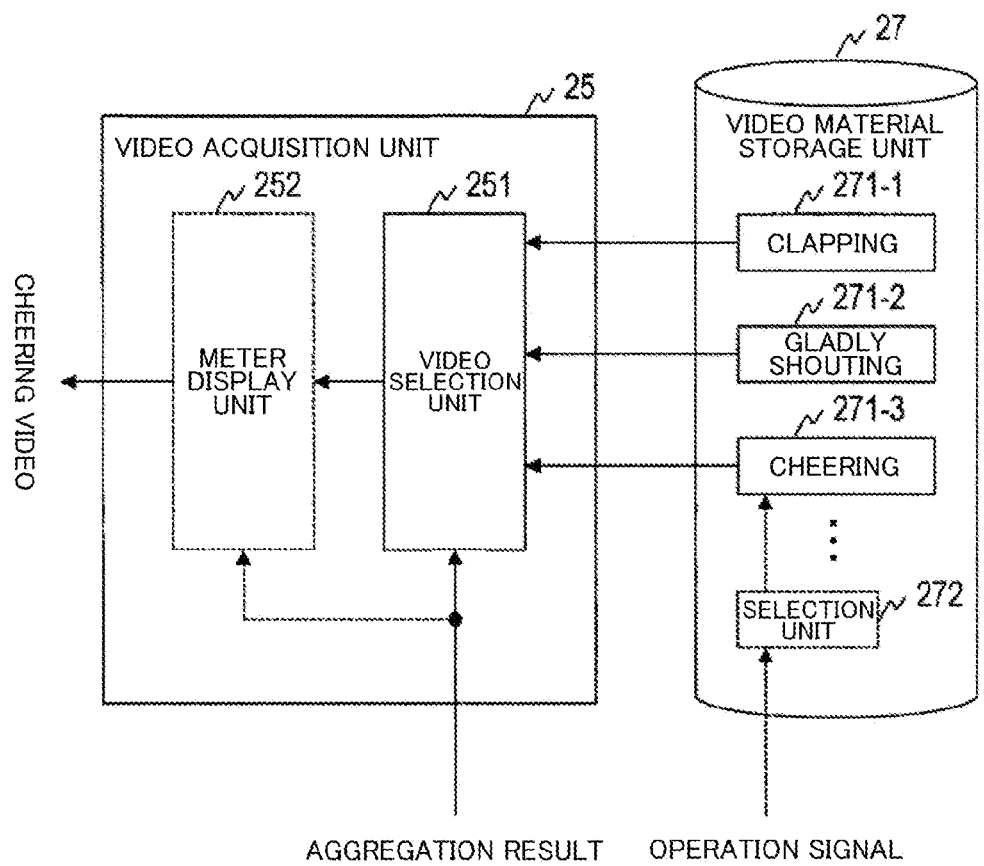
FIG. 8 is a diagram exemplifying a functional configuration of a video acquisition unit and a video material storage unit.

As shown in FIG. 8, the video material storage unit 27 stores in advance K types of video materials 271-1 to 271-$k$. Each of the video materials 271-$k$ is a preset video signal corresponding to each of a plurality of sound types identifying the sounds uttered by the users. For example, when the video to be distributed is a sport game, the video material 271-1 of the video in which many spectators are clapping, the video material 271-2 of the video in which many spectators are gladly shouting, the video material 271-3 of the video in which many spectators are cheering, and the like may be prepared. The video of the cheering may be changed according to the progress state of the game. In this case, the video material storage unit 27 further includes a selection unit 272. The selection unit 272 changes the video material 271-3 of the video of the cheering to a designated video signal according to an operation signal input from the outside automatically or manually by following a predetermined rule.

As shown in FIG. 8, the video acquisition unit 25 includes a video selection unit 251. The video selection unit 251 selects an appropriate one of the video materials 271-$k$ on the basis of the aggregation result output by the aggregation unit 21. For example, a video material corresponding to a sound type having the largest reception number $Nk$ of each sound type represented by the sound type aggregation result is selected. Further, for example, the video material corresponding to the sound type having the largest value $Vk \cdot Nk$ obtained by multiplying the reception number $Nk$ of the sound type by the average volume $Vk$ by using the average volume $Vk$ for each sound type indicated by the average volume calculation result may be selected. The video acquisition unit 25 outputs the selected video material as the cheering video.

Figure 9:
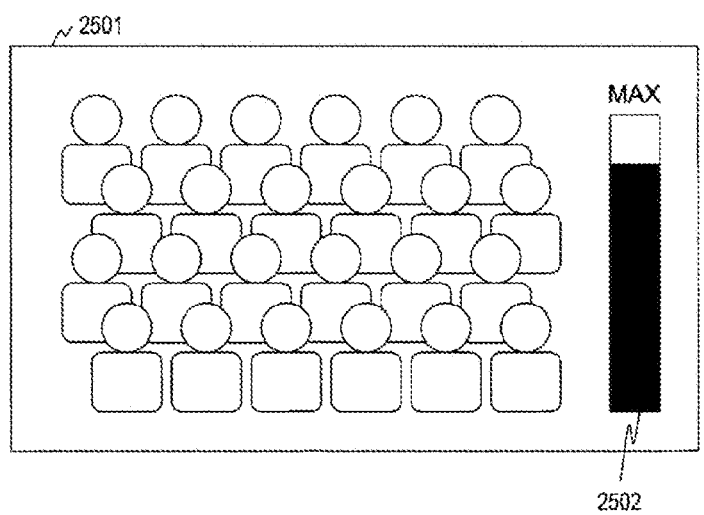
FIG. 9 is a diagram illustrating a meter display.

The video acquisition unit 25 may further include the meter display unit 252. A meter display unit 252 generates a cheering video by displaying an index calculated on the basis of the aggregation result output by the aggregation unit 21 on a meter and synthesizing the index with the video material. The index based on the aggregation result is, for example, a value used when selecting a video material. For example, the index may be the number of receptions $Nk$ of the sound type, or a value $Vk \cdot Nk$ obtained by multiplying the number of receptions $Nk$ of the sound type by the average volume $Vk$. An example of meter display is shown in FIG. 9. In the example shown in FIG. 9, a vertically long rectangular meter 2502 is displayed at the right end of the cheering video 2501. The meter 2502 represents the value of the index by separately painting the upper region and the lower region with the lower side set to 0 and the upper side set to the maximum value (MAX). FIG. 9 shows an example of meter display, and any display may be used as long as the index can be easily visually recognized.

In a step S26, the video reproduction unit 26 of the cheering support device 2 reproduces the support video output by the video acquisition unit 25 on the display D connected to the cheering support device 2.

With the above-described configuration, according to the cheering support system of the embodiment, it is possible to present, to the base of the distribution source, voice and/or video obtained by aggregating responses of a plurality of distributed viewers to different bases. Thus, the viewer can transmit the reaction to the distribution source without requiring complicated operation such as character string input, and the parties of the event can bodily sense the atmosphere such as the excitement of the viewer without being deprived of the visual sense.

[Modification 1]

The video acquisition unit 25 of the embodiment acquires a cheering video by selecting a video material prepared in advance. The video acquisition unit 25 of the modification 1 dynamically generates a video based on the aggregation result or the like to acquire a cheering video more suitable for a user's reaction.

The video acquisition unit 25 of the modification 1 generates a motion representing the action of the person from the cheering voice acquired by the voice acquisition unit 22, and acquires a video signal obtained by causing a preset video material to perform the action according to the motion as a cheering video. A technique for generating a motion from an acoustic signal and causing a video material to perform an action according to the motion can be realized by using, for example, a technique disclosed in Reference 1.

[Reference 1] Japanese Patent Application Laid-open No. 2018-32316

For example, by setting the avatar for each user in advance and synthesizing the video in which the avatar performs the motion in accordance with music such as a cheering song acquired a cheering, it is possible to generate a cheering video in which many users are dancing according to the music, and a video in which each user performs a motion corresponding to a reaction. The latter video is, for example, a video in which the user 10-1 performs a clapping motion and the user 10-N performs a shout motion. At this time, the number of users who take motion in the cheering video may be controlled on the basis of the aggregation result output by the aggregation unit 21. For example, when a half of the sound uttered by the user is the cheering sound, about a half of the users appearing in the cheering video can take motion.

The video generation technique described in Reference 1 will be described below. The video generation technique receives N pieces of time-series acoustic signals as acoustic signals related to each of performance of N kinds of musical instruments or singing as input, and obtains a time-series video in which the entire time-series acoustic signals is a video of an agent for performing or singing. N is any integer greater than or equal to 1. In this video generation technique, an action pattern is estimated only by inputting sound, by describing the relationship between sound and action in advance by using a neural network in deep learning. That is, the action pattern of the agent corresponding to the time-series acoustic signal is estimated by inputting the time-series acoustic signal or a vector group obtained by feature-quantizing them to the neural network learned in advance. Here, the neural network may be any of full-connected deep neural networks, recurrent neural networks, convolutional neural networks, and the like. That is, this video generation technique does not depend on the implementation form of the neural network.

In the video generation technique of the Reference 1, N pieces of time-series acoustic signals are first input, and a time interval video which is a performance video or a singing video of an agent corresponding to the time interval of the time-series acoustic signal is obtained for each time interval included in each time-series acoustic signal. At this time, the time interval video of the agent for each time interval included in each N pieces of time-series acoustic signals is obtained by using an action generation model representing the relation between the time-series acoustic signals and the action of the agent for performing or singing. The action generation model is obtained by learning in advance by using N pieces of learning time-series acoustic signals which are learning acoustic signals related to performance of N kinds of musical instruments or singing, and an action label indicating action of an agent performing or singing in each time interval included in the N pieces of learning time-series acoustic signals. Next, for each of the N pieces of time-series acoustic signals, one or more time interval videos obtained for the time-series acoustic signal are combined in a time-series order to obtain a time-series video related to the performing or singing of the agent corresponding to the whole time-series acoustic signal.

That is, the voice material stored in the voice material storage unit 24 is used as a learning time-series acoustic signal, and an action label showing the action of the agent is given to each time interval of each voice material, learning is performed by a neural network, so that a cheering video in which the preset avatar performs the motion according to the voice material can be generated.

[Modification 2]

In the above embodiment, it is assumed that one user is viewing an event in each user space. However, it is also conceivable that a plurality of users views the event in one user space, such as, for example, a sport bar. In this case, each user present in the same user space may exhibit a variety of responses, such as a user is clapping, while another user is gladly shouting. In this case, a plurality of sound types is mixed in the acoustic signal collected by the microphones.

When a plurality of kinds of reactions would be included in the acoustic signal collected by the microphones, the sound type detection unit 11 of the user terminal 1-*n* may separate the input acoustic signal for each sound type, and perform the processing of the above embodiment on each separated acoustic signal. Further, for example, a state in which a plurality of sound types is mixed such as "chapping+gladly shouting" and "clapping+cheering" may be defined as one sound type, and the processing of the above embodiment may be performed on the input acoustic signal as it is.

[Modification 3]

In the above embodiment,

In the above embodiment, the configuration is shown in which the cheering voice and/or the cheering video are selected based on the aggregation result of the reactions of the users, but the voice material and/or the cheering video material selected based on the reaction of each user may be output to a speaker and/or a display installed so as to correspond to each user. At this time, a panel on which the figure of a human is drawn may be installed instead of the video output to the display. For example, when a small display is installed in the spectator seats of the stadium where sport is being played and a cheering video corresponding to the reaction of each user is outputted, the atmosphere of the user can be reproduced in the whole stadium.

[Modification 4]

In the above embodiment, the configuration is shown in which the user's reactions are aggregated for the entire user to output the cheering voice and/or the cheering video, but the user may be divided into a plurality of sets, and the user's reactions are aggregated for each set to output the cheering voice and/or the cheering video for each set. For example, in a stadium where sport is being played, an area is divided into visitor seats on a home side and visitor seats on an away side, and different cheering sounds and/or cheering videos can be output between the reactions of the users associated with the home side and the reactions of the users associated with the away side.

[Modification 5]

In the above embodiment, the configuration is shown in which user's reactions are presented to parties of an event, however, the user's reactions may be presented to other users viewing the same event at the same time. Specifically, an index based on an aggregation result output by the aggregation unit 21 is synthesized with a video to be distributed to the user terminal 1-*n* by the cheering support system. Thus, the viewer of the event can cheer while feeling the atmosphere of the entire viewer of the event.

Although embodiments of the invention have been described thus far, the specific configuration is not intended to be limited to these embodiments, and it goes without saying that changes to the design and the like, to the extent that they do not depart from the essential spirit of the invention, are included in the invention. Not only the various kinds of processing described in the embodiment is performed chronologically in the described order, but may also be performed in parallel or individually in accordance with processing capability of the device performing the processing or as necessary.

[Program and Recording Medium]

Figure 10:
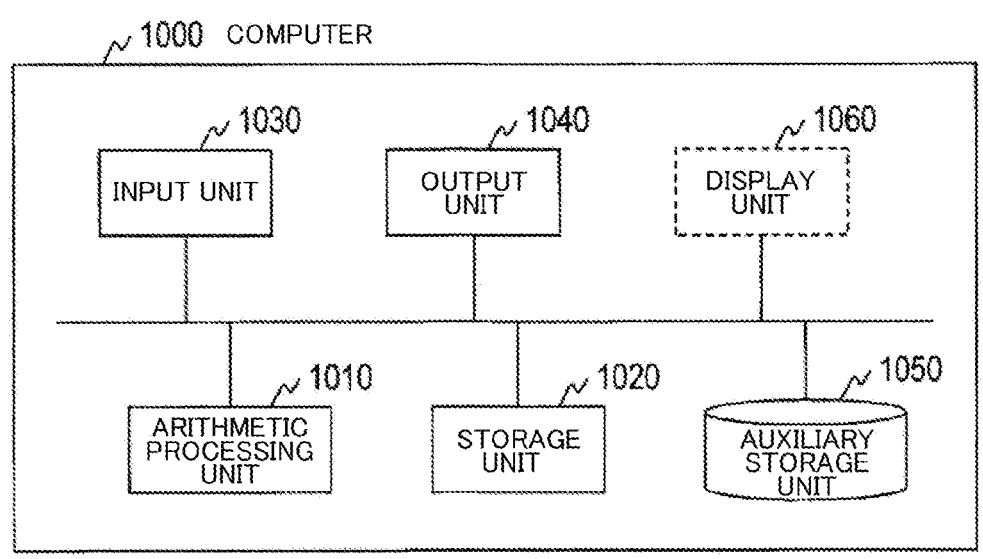
FIG. 10 is a diagram illustrating a functional configuration of a computer.

When the various processing functions of the respective devices described in the foregoing embodiments are implemented by a computer, the processing contents of the functions which each device needs to have are written in a program. Then, by loading the program into a storage unit 1020 of the computer illustrated in FIG. 10 and causing an arithmetic processing unit 1010, an input unit 1030, an output unit 1040, and the like to execute the program, the various processing functions of each of the above devices are implemented on the computer.

The program in which processing contents are described can be recorded in advance on a computer-readable recording medium. The computer-readable recording medium is, for example, a non-transitory recording medium, and is a magnetic recording device, an optical disk, or the like.

The program is distributed, for example, by selling, transferring, or lending a portable recording medium such as a DVD or a CD-ROM on which the program is recorded. In addition, the distribution of the program may be performed by storing the program in advance in the storage device of a server computer and transferring the program from the server computer to another computer via a network.

The computer executing such a program first stores the program recorded in the portable recording medium or the program transferred from the server computer, for example, in an auxiliary recording unit 1050 once, which is its own non-transitory storage device. Then, when executing the processing, the computer loads the program stored in the auxiliary recording unit 1050, which is its own non-transitory storage device, into the storage unit 1020, which is a transitory storage device, and executes processing in accordance with the loaded program. Further, as another mode for performing the program, the computer may directly read the program from a portable recording medium and perform processing according to the program, in addition, the computer may perform processing according to the received program every time the program is transferred from the server computer to the computer. The above-described processing may be configured to perform by a so-called ASP (Application Service Provider) type service realizing the processing function only in accordance with an execution instruction and result acquisition without transmitting the program from the server computer to the computer. Note that the program according to the present embodiment includes one that is information subjected to processing by an electronic calculator and complies with the program (such as data that is not a direct instruction to a computer but has properties defining the processing of the computer).

Further, a predetermined program is performed on a computer to configure the present device in the embodiment, but at least a part of the processing contents may be realized by hardware.

The invention claimed is:

1. A method for reproducing cheering data, comprising:
acquiring cheering data, wherein the cheering data includes a first audio signal and/or a first video signal, the cheering data is associated with a sound type, the cheering data is based on sound uttered by a plurality of viewers, respective viewers of the plurality of viewers are associated with a plurality of spaces, the plurality of spaces are distinct from a space associated with a distribution source of a second audio signal and/or a second video signal, the first audio signal and/or the first video signal is associated with a group of viewers in the plurality of viewers;
reproducing the acquired cheering data, wherein the reproducing the acquired cheering data further includes emphasizing, based on a number of viewers in the group of viewers, the first audio signal and/or first video signal; and
aggregating a number of viewers based on the character strings, wherein the acquired cheering data includes emphasizing acoustic signals associated with the first audio signal as more viewers are associated with a character string associated with the first audio signal.

2. The method according to claim 1, wherein
the reproducing the acquired cheering data further includes emphasizing the first audio signal and/or the first video signal when a first aggregated volume of first sound uttered by the group of viewers is larger than a second aggregated volume of second sound uttered by another group of viewers.

3. The method according to claim 1, wherein
the first video signal is associated with the sound type, and the sound type is further associated with the sound uttered by the plurality of viewers.

4. The method according to claim 1 further comprising:
identifying the sound uttered by the viewers into one or more sound types of a plurality of predetermined sound types; and
determining the number of viewers in the group of viewers associated based on the sound associated with the sound type.

5. The method according to claim 1 further comprising:
receiving character strings obtained by voice recognizing utterances by the group of viewers of the plurality of viewers based on the sound uttered by the group of viewers of the plurality of viewers.

6. The method according to claim 2 further comprising:
receiving a volume of the sound uttered by a viewer of the plurality of viewers; and
calculating, based on the volume of the sound uttered by the viewer, a statistical value of a sound volume associated with a sound type associated with the sound uttered by the viewer.

7. A device for reproducing cheering data, the device comprising a processor configured to execute a method comprising:
acquiring the cheering data, wherein the cheering data includes a first audio signal and/or a first video signal, the cheering data is associated with a sound type, the cheering data is based on sound uttered by a plurality of viewers, respective viewers of the plurality of viewers are associated with a plurality of spaces, the plurality of spaces are distinct from a space associated with a distribution source of a second audio signal and/or a second video signal, the first audio signal and/or the first video signal is associated with a group of viewers in the plurality of viewers;
reproducing the acquired cheering data, wherein the reproducing the acquired cheering data further includes emphasizing, based on a number of viewers in the group of viewers, the first audio signal and/or the first video signal; and
aggregating a number of viewers based on the character strings, wherein the acquired cheering data includes emphasizing acoustic signals associated with the first audio signal as more viewers are associated with a character string associated with the first audio signal.

8. A computer-readable non-transitory recording medium storing computer-executable program instructions that when executed by a processor cause a computer to execute a method comprising:
acquiring the cheering data, wherein the cheering data includes a first audio signal and/or a first video signal, the cheering data is associated with a sound type, the cheering data is based on sound uttered by a plurality of viewers, respective viewers of the plurality of viewers are associated with a plurality of spaces, the plurality of spaces are distinct from a space associated with a distribution source of a second audio signal and/or a second video signal, the first audio signal and/or the first video signal is associated with a group of viewers in the plurality of viewers;
reproducing the acquired cheering data, wherein the reproducing the acquired cheering data further includes emphasizing, based on a number of viewers in the group of viewers, the first audio signal and/or the first video signal; and
aggregating a number of viewers based on the character strings, wherein the acquired cheering data includes emphasizing acoustic signals associated with the first audio signal as more viewers are associated with a character string associated with the first audio signal.

9. The method according to claim 1, further comprising:
transmitting a combination of data for distribution to the plurality of viewers, the combination of data including: the first audio signal and/or the first video signal, and the second audio signal and/or the second video signal.

10. The device according to claim 7, the processor further configured to execute a method comprising:
transmitting a combination of data for distribution to the plurality of viewers, the combination of data including: the first audio signal and/or the first video signal, and the second audio signal and/or the second video signal.

11. The device according to claim 7, wherein
the reproducing the acquired cheering data further includes emphasizing the first audio signal and/or the first video signal when a first aggregated volume of first sound uttered by the group of viewers is larger than a second aggregated volume of second sound uttered by another group of viewers.

12. The device according to claim 7, wherein
the first video signal is associated with the sound type, and the sound type is further associated with the sound uttered by the plurality of viewers.

13. The device according to claim 7, the processor further configured to execute a method comprising:
identifying the sound uttered by the viewers into one or more sound types of a plurality of predetermined sound types; and
determining the number of viewers in the group of viewers associated based on the sound associated with the sound type.

14. The device according to claim 7, the processor further configured to execute a method comprising:
receiving character strings obtained by voice recognizing utterances by the group of viewers of the plurality of viewers based on the sound uttered by the group of viewers of the plurality of viewers.

15. The device according to claim 11, the processor further configured to execute a method comprising:
receiving a volume of the sound uttered by a viewer of the plurality of viewers; and
calculating, based on the volume of the sound uttered by the viewer, a statistical value of a sound volume associated with a sound type associated with the sound uttered by the viewer.

16. The computer-readable non-transitory recording medium according to claim 8, the computer-executable program instructions when executed further causing the computer to execute a method comprising:
transmitting a combination of data for distribution to the plurality of viewers, the combination of data including: the first audio signal and/or the first video signal, and the second audio signal and/or the second video signal.

17. The computer-readable non-transitory recording medium according to claim 8, wherein
the reproducing the acquired cheering data further includes emphasizing the first audio signal and/or the first video signal when a first aggregated volume of first sound uttered by the group of viewers is larger than a second aggregated volume of second sound uttered by another group of viewers.

18. The computer-readable non-transitory recording medium according to claim 8, wherein
the first video signal is associated with the sound type, and the sound type is further associated with the sound uttered by the plurality of viewers.

19. The computer-readable non-transitory recording medium according to claim 8, the computer-executable program instructions when executed further causing the computer to execute a method comprising:
identifying the sound uttered by the viewers into one or more sound types of a plurality of predetermined sound types; and
determining the number of viewers in the group of viewers associated based on the sound associated with the sound type.

20. The computer-readable non-transitory recording medium according to claim 8, the computer-executable program instructions when executed further causing the computer to execute a method comprising:
receiving character strings obtained by voice recognizing utterances by the group of viewers of the plurality of viewers based on the sound uttered by the group of viewers of the plurality of viewers.

* * * * *